Oct. 19, 1965  K. HEINRICH  3,212,857
COUNTER-CURRENT EXTRACTION APPARATUS
Filed May 22, 1961  5 Sheets-Sheet 1

INVENTOR:
Kurt HEINRICH
BY Michael S. Striker
his ATTORNEY

Oct. 19, 1965  K. HEINRICH  3,212,857
COUNTER-CURRENT EXTRACTION APPARATUS
Filed May 22, 1961  5 Sheets-Sheet 5

INVENTOR
Kurt HEINRICH
BY
Michael S. Striker
his ATTORNEY

United States Patent Office 3,212,857
Patented Oct. 19, 1965

3,212,857
COUNTER-CURRENT EXTRACTION APPARATUS
Kurt Heinrich, Wevelinghoven, Germany, assignor to Maschinenfabrik Buckau R. Wolf Aktiengesellschaft, Grevenbroich, Germany
Filed May 22, 1961, Ser. No. 111,818
Claims priority, application Germany, May 23, 1960, M 45,401
9 Claims. (Cl. 23—270)

The present invention relates to a process and to an apparatus for continuous countercurrent extraction of soluble substances from solid feed materials of animal, vegetable or an organic origin. Among many other uses, the process and apparatus of my invention are especially suited for the extraction of sugar from sugar cane or sugar beets.

The presently known processes for continuous countercurrent extraction may be divided into two groups, namely, continuous extraction processes carried out in a single vessel and continuous extraction processes carried out in two or more serially arranged vessels. When the extraction is carried out in a series of vessels, the solvent is gradually enriched with the soluble substance as it caused to flow from vessel to vessel counter to the flow of comminuted feed material. The latter is discharged when the percentage of soluble substance contained therein is reduced to a predetermined minimum. In each successive stage of the extraction process, the ratio of soluble substance contained in the feed material to the ratio of soluble substance contained in the solvent assumes a different value.

An important object of my invention is to provide an improved process for continuous countercurrent extraction of soluble substances from feed materials according to which the extraction may be completed within very short periods of time and according to which the combined volume of vessels containing the solvent and the feed material may be reduced well below the combined volume of vessels utilized in the practice of heretofore known extraction processes.

Another object of the invention is to provide an apparatus for the practice of my process which is constructed and assembled in a way to insure that the soluble substance is uniformly extracted from each particle of the feed material, which may be conveniently adjusted to change the ratio of solvent to feed material, and which is capable of simultaneously processing very large quantities of highly concentrated feed material.

With the above objects in view, the invention resides in the provision of a process for repeatedly contacting and treating a feed material with a solvent in at least two interconnected vessels of an extraction apparatus to extract a soluble substance from the feed material, the process comprising essentially the steps of introducing fresh feed material and solvent enriched with soluble substance into one of the vessels, forming a mixture of solvent and feed material by mixing the contents of the one vessel, introducing fresh solvent into the other vessel, conveying a portion of the mixture from the one vessel to the other vessel, forming a mixture of solvent and feed material in the other vessel by mixing the contents of the other vessel, separating solvent from a portion of the mixture contained in the other vessel and from the mixture conveyed to the other vessel from the one vessel and returning the separated solvent to the one vessel, withdrawing feed material from the other vessel, and withdrawing further enriched solvent from the one vessel by separating solvent from the feed material introduced into the one vessel and from a portion of the mixture contained in the one vessel.

The extraction apparatus of my invention comprises essentially a plurality of treating vessels, first conduit means for conveying a mixture of feed material and solvent to each of the vessels in a first direction, second conduit means for conveying solvent to and from each of the vessels in a second direction counter to the first direction, and means associated with each of the vessels for separating solvent from the mixture conveyed to the respective vessel by the first conduit means, for separating solvent from the mixture in the respective vessel, and for admitting the separated solvent to the second conduit means so that the latter may convey the separated solvent in the second direction.

Certain other features of the extraction apparatus reside in the provision of specially constructed separating means for the solvent, in the provision of specially constructed circulation producing means in each vessel, in the provision of novel metering means for regulating the flow of the mixture in the first conduit means in dependency on the concentration of feed material in the respective vessel, and in the provision of specially constructed individual conduits forming part of the first conduit means for conveying a mixture of feed material and solvent to the separating means of the respective vessels.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

Figures 1, 5:
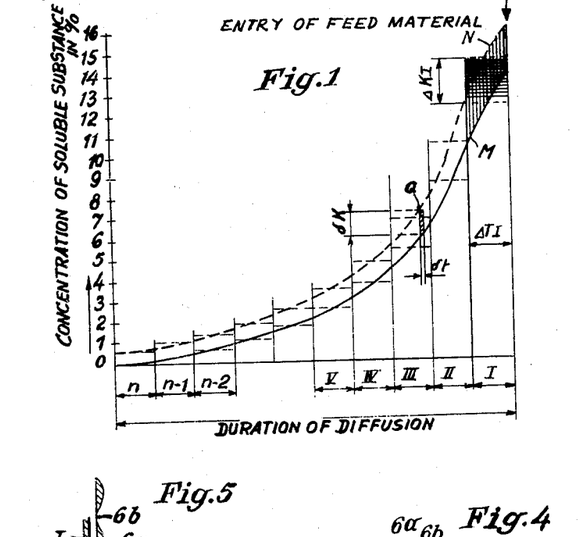
FIG. 1 is a diagram wherein the two curves respectively indicate the concentration of soluble substance in the solvent and in the feed material.
FIG. 5 is an enlarged fragmentary section through the flange of the sieve as seen in the direction of the arrows from the line V—V of FIG. 4.

Before proceeding with a detailed description of the apparatus for the practice of my process, I will now describe the chart of FIG. 1 wherein the curves M, N respectively illustrate the concentration of soluble substance in the solvent and in the feed material, it being assumed that the extraction of soluble substance is carried out countercurrently. The time of diffusion is measured along the X-axis, and the concentration of soluble substance in percent is measured along the Y-axis. It is assumed that the feed material is a pulp made of sugar beets or sugar cane and that the solvent is hot water. The extraction takes place in $n$ stages and the intervals I, II, III . . . $n$ shown along the X-axis indicate that the duration of extraction is the same in each stage. The area between the curves M, N represents the proportion or ratio of concentration of soluble substance, i.e. sugar, in the pulp (curve N) and in hot water (curve M) in each of the consecutive stages. As shown, the slices or particles of sugar beets or sugar cane originally contain about 16 percent sugar, and the percentage of sugar drops according to the curve N so that the pulp left after extraction contains only about 0.5 percent sugar. On the other hand, the concentration of sugar in hot water (curve M) rises from zero to about 14 percent. The effectiveness of diffusion can be calculated at each stage of the extracting operation by multiplying the diffusion time with the difference in concentration of soluble substance in the feed material and solvent. As stated above, the area between the curves M, N is the proportionality factor which is indicative of the efficiency of a given extraction apparatus. For example, and assuming that the extraction takes place in a single vessel in which the flow of solvent is counter to the flow of feed material, the small hatched rectangle Q shown in FIG. 1 has a width $\delta_t$ and a height $\delta_k$, i.e. the area of this rectangle may be calculated by multiplying the interval of time represented by the value $\delta_t$ with the median distance $\delta_k$ between the curves M, N at this particular stage of extraction. The sum of all such narrow rectangles equals the area between the curves M, N. Thus, this area is a proportionality factor for the effectiveness of the extraction apparatus. The just mentioned calculation is applicable in all extraction apparatus wherein the flow of feed material is counter to the flow of solvent.

The area bounded by the sections of curves M, N in the vertical column corresponding to the stage I may be calculated by multiplying $\Delta KI$ with $\Delta TI$ wherein $\Delta KI$ is the median difference between the concentration of sugar in the pulp and in hot water in Stage I, and wherein $\Delta TI$ is the duration of diffusion in the stage I. This calculation can be repeated for the stages II, III . . . $n$ and, again, the total area between the curves M, N in a multi-stage countercurrent extraction is a proportionality factor indicative of the effectiveness of the multi-vessel apparatus. It will be noted that the area of the rectangle with sides $\Delta KI$ and $\Delta TI$ at lest approximates the area bounded by the sections of curves M, N in the vertical column corresponding to the stage I. In other words, the vertically hatched area at the upper right-hand end of FIG. 1 equals the sum of areas obtained by multiplying $\delta_k$ with $\delta_t$ in the stage I because the value $\Delta KI$ is a median value for the stage I.

In all heretofore known extraction apparatus of which I am aware at this time, it is considered of importance that the diffusion of soluble substance in the solvent take place without any agitation or with minimal agitation so as to insure that the rise in concentration of soluble substance in the solvent may reach a maximum possible value. In other words, it is considered that the extraction of soluble substance will progress at a higher rate if the solvent flowing counter to the feed material is not agitated but remains as undisturbed and quiescent as practically possible.

My invention is based on the recognition that the extraction is more effective if the feed material and the solvent are thoroughly agitated in each stage of the extracting operation so as to bring about a very intimate intermixing of feed material with the solvent. As a result of such agitation and circulation, the solvent particles are caused to travel at speeds substantially different from the speed of particles of feed material whereby the particles of pulpy feed material are subjected not only to a diffusing but also to a thorough washing action, i.e. in addition to giving up a certain percentage of sugar or other soluble substance to the solvent, the comminuted particles of the feed material are subjected to a purely physical washing action of the solvent. This washing action of solvent insures a more rapid extraction of soluble substance which is explainable as follows:

Each individual particle of feed material is surrounded by a thin layer of solvent which adheres thereto and which separates the particle from the moving solvent. The concentration of soluble substance in the thin layers surrounding the individual particles of feed material is higher than the concentration of soluble substance in the main mass of solvent. Owing to the turbulence created in each stage of the extracting operation, the main mass of solvent repeatedly washes away the thin layers surrounding the individual particles of comminuted feed material and is thereby enriched with soluble substance. In addition, each particle whose solvent layer was washed away is immediately surrounded by a new solvent layer with a lower concentration of soluble substance so that the new layer may take up soluble substance from the particle and is thereupon admixed to the main mass of solvent when it is subsequently washed away to permit the formation of a new layer, and so forth. In other words, a thorough agitation and intermixing of solvent with feed material in each stage of the extracting operation brings about a more frequent contact of new solvent with each particle of feed material which results in more rapid extraction and renders it possible to utilize less solvent than in heretofore known processes of which I am aware.

In accordance with a preferred embodiment of my invention, each cell or vessel of an extraction apparatus is provided with one or more rapidly revolving agitating or circulation producing instrumentalities so that the entire contents of the vessel, consisting of a homogeneous, intimate mixture of feed material and solvent, is caused to move in a turbulent flow. A regulatable percentage of the mixture is continuously withdrawn from each vessel and is introduced into the next vessel, as seen in the direction in which the feed material is advanced (i.e. counter to the flow of solvent), while a certain amount of solvent is separated from the mixture contained in the vessel and is returned to the preceding vessel, i.e. counter to the advance of feed material. Thus, the mixture agitated in the first vessel is partially fed to the second vessel while a stream of solvent separated from the agitated mixture in the second vessel is returned to the first vessel; the mixture agitated in the second vessel is partially fed to the third vessel and a certain amount of solvent contained in the third vessel is separated from the feed contained in the third vessel is separated from the feed material therein and is returned to the second vessel; and so forth to the last vessel. Fresh solvent is admitted to the last vessel and fresh feed material is admitted to the first vessel. Also, pulp left after extraction is removed from the last vessel and fully enriched solvent is withdrawn from the first vessel. The feed material separated from the solvent in each vessel is immediately introduced into the mixture in the respective vessel and is thereupon caused to advance into the next vessel.

It is preferred to control the flow of feed material and solvent in such a way that each vessel contains a mixture of highly concentrated feed material, e.g. about 40 percent.

It will be noted that, in accordance with my process, the solvent or treating fluid actually serves as a carrier for feed material to advance the latter from treating station to treating station but the carrier solvent is not admixed to the contents of the vessel at the next treating station because it is separated from the feed material and is returned to the vessel at the preceding treating station together with solvent of lesser concentration which latter is separated from the mixture contained in the respective vessel. In other words, the second conduit means which, as the first conduit means, comprises a series of individual conduits, conveys a mixture of carrier solvent with solvent separated from the solid-fluid mixture in the respective vessel in a direction counter to the direction in which the feed material is conveyed through the first conduit means.

Figure 2:
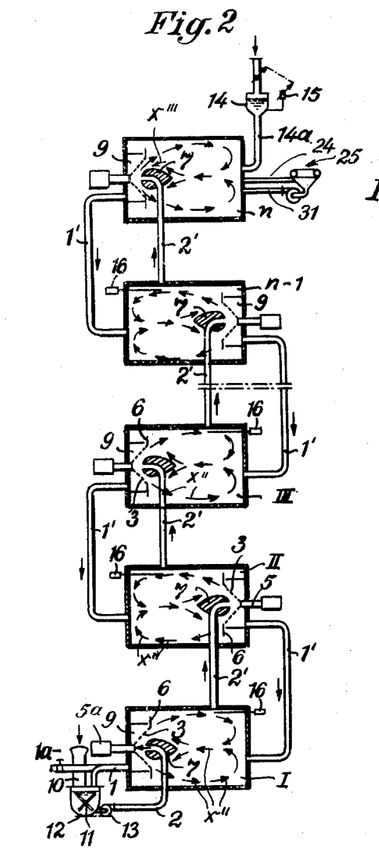
FIG. 2 is a schematic vertical section through a multi-vessel extraction apparatus embodying one form of my invention, the vessels being separated from and disposed above each other.

FIG. 2 illustrates schematically one form of the extraction apparatus for the practice of my process. This extraction apparatus comprises a plurality of vertically spaced cylindrical or cubical vessels or cells I, II, III . . . n−1, n including a lowermost or first cell I and an uppermost or last cell n. The comminuted solid feed material, e.g. pulp made of sugar cane or sugar beets, is introduced through the inlet pipe 10 leading to the lowermost cell I, and fresh solvent is introduced at 14a to the uppermost cell n. Of course, the exact number of cells in the apparatus of FIG. 2 depends on the nature of the feed material, on the nature of treating fluid or solvent and on the desired capacity of the apparatus. The cells are preferably completely filled with the mixture of solvent and feed material.

The adjacent cells are connected with each other by conduits 1' and 2', the conduits 1' serving as a means for conveying solvent from a higher cell to a lower cell (i.e. counter to the flow of feed material), and the conduits 2' serving as a means for conveying a homogeneous mixture of feed material and solvent from a lower cell to the cell thereabove.

Figures 3, 4, 4A, 6A, 6B:
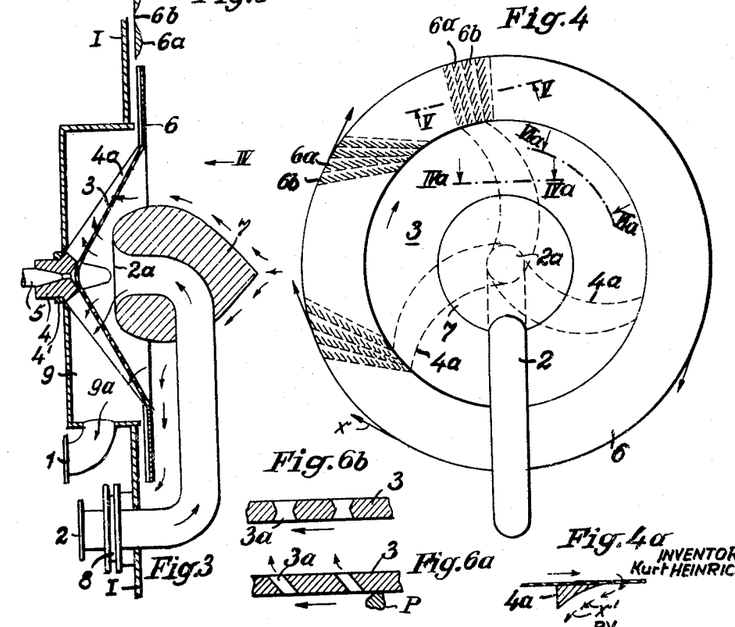
FIG. 3 is a greatly enlarged fragmentary detail view of a vessel, showing one form of a sieve whose purpose is to agitate the contents of the cell and to simultaneously separate solvent from the feed material.
FIG. 4 is a front elevational view of the structure shown in FIG. 3.
FIG. 4a is a section through a supporting arm of the sieve as seen in the direction of the arrows from the line IVa—IVa of FIG. 4.
FIG. 6a is a greatly enlarged fragmentary section through the sieve as seen in the direction of the arrows from the line VIa—VIa of FIG. 4.
FIG. 6b is a similar fragmentary section through a modified sieve which is formed with perforations bounded by conical walls.

Each cell accommodates therewithin a combined circulating and solvent-separating arrangement of the type shown in greater detail in FIGS. 3 and 4. I will now describe the separating arrangement of FIGS. 3 and 4 before proceeding with the description of FIG. 2 because the operation of the extraction apparatus will be more readily understood once the manner of circulating the mixture in the individual cells and of separating solvent from the mixture is explained.

Figure 3A:
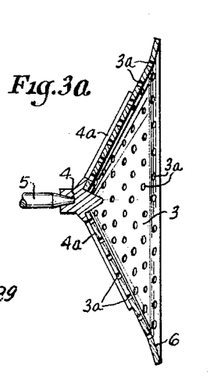
FIG. 3a is a schematic section through a slightly different sieve which is formed with a conical flange.

The main component part of the circulating and separating arrangement assumes the form of a conical rotary sieve or filter 3 which is fixed to the hub 4 of a drive shaft 5 by means of specially configurated supporting arms 4a. The hub 4 is rotatably mounted in the wall of the cell I and its shaft 5 is driven at high speed by a motor 5a shown in FIG. 2. The sieve 3 is concentrically surrounded by an annular flange 6 whose side turned toward the interior of the cell I is formed with alternating projections or hills 6a and depressions or valleys 6b, best shown in FIG. 5. These projections and depressions impart to the right-hand side of the flange 6, as viewed in FIG. 3, an undulate shape. FIG. 4 shows that the projections 6a and depressions 6b may extend substantially radially and/or that they may be arranged in substantially tangentially extending rows or groups. FIG. 3a shows that the flange 6 need not be located in a plane which is perpendicular to the axis of the sieve 3 but that it may assume a frustoconical shape and that it may enclose a certain angle with the sieve.

At the rear, i.e. convex, side of the sieve 3 which is adjacent to the wall of the cell I, there is provided a preferably cylindrical solvent-collecting chamber 9 whose cylindrical wall extends into close proximity of the sieve, and more particularly into close proximity of the flange 6 so that the walls of the chamber 9, the sieve 3 and the flange 6 enclose a compartment 9a which communicates with the intake end of the conduit 1 in the cell I and with the intake ends of conduits 1' in the other cells. The chamber 9 actually constitutes an outwardly projecting extension of the end wall of the cell I and, as shown in FIG. 3, carries the bearing 4' for the hub 4. A conduit 2 extends through the wall of the cell I adjacent to the chamber 9 and its radially outwardly diverging discharge nozzle 2a is surrounded by a streamlined deflector 7. It will be noted that the nozzle 2a and the deflector 7 are coaxial with the sieve 3 and that a portion of the deflector actually extends into the conical space within the sieve 3. The deflector 7 is preferably of circular cross-section, see FIG. 4, and its distance from the concave side of the sieve 3 may be adjusted preferably together with the nozzle 2a, by an adjusting assembly shown in the lower part of FIG. 3. This adjusting assembly comprises a stuffing box 8 including a stationary tubular member fixed to the wall of the cell I and an axially reciprocable tubular member secured to the conduit 2 and telescoped into stationary member.

The mesh of the sieve 3, i.e. the cross-sectional areas of the perforations 3a formed therein, depends on the extent to which the feed material is comminuted. As shown in FIG. 6b, the axes of the perforations 3a in the sieve 3 may be perpendicular to the wall of the sieve or, as shown in FIG. 6a, they may be inclined with respect to the sieve wall through an angle other than 90 degrees. The configuration of perforations as shown in FIG. 6a is of advantage if it is desired to prevent comminution of particles P of feed material by engagement with the edges bounding the perforations 3a. FIG. 6b shows that the walls bounding the perforations 3a may diverge conically toward the rear or convex side of the sieve and that the intake portions of these walls may diverge slightly outwardly toward the concave side of the sieve, i.e. that the end portions of the walls bounding the perforations 3a may be beveled toward both sides of the sieve.

The sieve 3 performs the following functions: It is assumed that the cell I is filled with a mixture consisting of feed material and solvent and that the sieve 3 is rotated at high speed together with the flange 6. As soon as the sieve begins to rotate, its concave side which is turned toward the interior of the cell I begins to rotate the mixture contained in the cell whereby the centrifugal force compels the solid particles of the mixture to move radially outwardly. That component of the centrifugal force which is perpendicular to the conical wall of the sieve 3 causes the liquid matter (solvent) contained in the mixture to penetrate through the perforations 3a and to enter the compartment 9a of the chamber 9. The centrifugal force causes the particles of feed material to slide along the conical side of the sieve 3 so that the outwardly advancing particles automatically clean the conical side. Owing to such automatic cleaning action of the outwardly advancing particles of feed material, the efficiency of the sieve 3 is much higher than and in fact, is a multiple of the efficiency of known sieves, and this efficiency may be further increased by utilizing specially configured supporting arm 4a. As shown in FIG. 4, the arms preferably assume an arcuate shape in that they extend in an arc from the hub 4 toward the flange 6 and are bent rearwardly, as viewed in the direction in which the sieve 3 rotates (see the arrows X in FIG. 4). FIG. 4a shows that the arms may be of substantially triangular cross-sectional contour having one side adjacent to the rear side of the sieve and a tip located forwardly, as seen in the direction in which the sieve rotates, so that the liquid matter penetrating through the perforations 3a is deflected away from the rear side of the sieve (arrows X'). The purpose of the arms 4a is to guide the liquid matter radially outwardly of the sieve 3 and to provide room for the passage of additional liquid matter (enriched solvent) through the perforations 3a. The central portion of the sieve surrounding the hub 4 actually sucks the mixture of feed material and solvent delivered by the coaxial nozzle 2a into the conical space bounded by the concave right-hand side of the sieve. The efficiency of the sieve may be varied by changing the r.p.m. of the shaft 5 and/or by changing the conicity of the sieve. For example, the conicity of the sieve will be less if the feed material is comparatively soft because, were the angle of inclination of the concave inner side of the sieve too large, the feed material would bear against the sieve with an excessive force which could cause the edges of the walls bounding the perforations 3a to further comminute the particles of feed material.

Referring back to FIG. 2, the feed material introduced through the inlet pipe 10 enters a trough 12 which comprises a suitable mixer 11 and which communicates with the discharge end of the conduit 1 leading from the chamber 9 of the lowermost cell I. The mixer 11 transforms the freshly introduced feed material and the enriched solvent delivered by the conduit 1 into a mixture whose consistency is such that it may be conveyed through the conduit 2 by a suitable pump 13. The conduit 2 delivers the mixture through the discharge nozzle 2a against the concave inner side of the sieve 3 in the cell I. The sieve separates the solvent from the feed material in a manner as described hereinabove, and the separated solvent is caused to flow through the conduit 1 and back to the trough 12 to be admixed to the freshly introduced feed material. Of course, the solvent returning through the conduit 1 is strongly enriched with soluble substance because it was in contact with feed material during its passage through the conduit 2 and because it is actually a mixture of solvent admitted to cell I through the conduit 1 and solvent already contained in the cell I.

The feed material separated from the solvent by the sieve 3 is caused to circulate in the cell I in the direction indicated by the arrows X". This concentrated feed material brings about strong agitation and recirculation of the mixture already contained in the cell I and the mixture is thereby enriched with feed material. The projections 6a and the depressions 6b of the annular flange 6 assist the sieve 3 in bringing about the illustrated flow of feed material in the cell I. As shown, the whirling or turbulent flow of the mixture begins at the center of the sieve 3 and continues radially outwardly toward the upper and lower walls of the cell I to be deflected by the right-hand wall of the cell inwardly and toward the deflector 7 which in turn guides the stream back toward the conical side of the sieve 3. The deflector 7 prevents the freshly introduced solvent (conduit 2 and the discharge nozzle 2a) from being admixed to the solvent contained in the mixture circulating in the cell I in that the mixture introduced through the nozzle 2a is immediately directed toward the sieve 3 so that the solvent passes through the perforations 3a and only the feed material of the mixture entering through the conduit 2 remains in the cell I. It will be noted that the deflector 7 screens a substantial part of the conical side of the sieve 3, i.e. that part which is directly adjacent to the stream discharged through the diverging nozzle 2a; this insures that the mixture circulating in the cell I does not mix with the solvent delivered by the conduit 2. The maximum diameter and the configuration of the deflector 7 are preferably selected in such a way that the mixture circulating in the direction indicated by the arrows X" is deflected toward the flange 6 rather than against the conical side of the sieve 3.

A certain amount of the mixture circulating in the direction of the arrows X" is continuously withdrawn from the cell I through the conduit 2' leading to the cell II thereabove. The combined volume of the mixture withdrawn from the cell I through the conduit 2' equals the volume of the mixture introduced into the cell I through the conduit 2 and of solvent withdrawn through the conduit 1 so that the cell I remains continuously filled with a mixture of feed material and solvent.

The extraction of soluble substance in the cell II occurs in the same way as in cell I, i.e. the mixture delivered by the conduit 2' is separated into solvent which is returned to cell I through the conduit 1' and into highly concentrated feed material which is admixed to the mixture circulating in the cell II in the directions indicated by the arrows X". The extraction is then repeated in the cells III . . . n−1, n in that the mixture of feed material and solvent flows from the cell II to the cell III and so forth to the cell n, whereas the enriched solvent flows in the opposite direction, i.e. from the cell n to the cell n−1 and so on to the cells III, II and I. It will be noted that the feed material admitted through the inlet pipe 10 passes through each of the cells I . . . n in that order, and is finally withdrawn from the cell n through a conduit 24 into a device 25 whose construction will be described in greater detail in connection with FIG. 7. The device 25 communicates with a return conduit 31 which delivers solvent separated from the feed material back to the cell n and/or n−1.

As mentioned hereinabove, the solvent may consist of hot water if the feed material consists of comminuted sugar cane or sugar beets. Of course, the composition of solvent varies with the composition of feed material, i.e. the solvent is different when the apparatus of FIG. 2 is utilized for extraction of oil from a vegetable feed material, such as soybeans.

The solvent is fed into a reservoir 14 which communicates with the inlet pipe 14a leading to the uppermost cell n. The reservoir 14 is provided with a level gauge 15 of any known design whose function is to insure that the solvent always fills the reservoir to a predetermined level. The gauge 15 further insures that the mixture filling the cells I . . . n is maintained at a predetermined pressure whose magnitude depends on the height of the liquid column in the pipe 14a and reservoir 14. The cells I . . . n constitute a multicell unit and, in order to insure a flow of solvent (pipe 14a and conduits 1', 1) counter to the flow of feed material (inlet pipe 10 and conduits 2, 2' and 24), the fully enriched solvent must be continuously withdrawn from the lowermost cell I through a conduit 1a which branches from the conduit 1 leading to the mixer 11. The conduit 1a conveys enriched solvent to further treating and processing stations, not shown. The quantity of enriched solvent withdrawn through the conduit 1a may equal the quantity of fresh solvent admitted through the conduit 14a, and the quantity of fresh feed material admitted per unit of time through the inlet pipe 10 may equal the quantity of feed material withdrawn from the device 25.

The fresh solvent entering the cell n through the pipe 14a is immediately admixed to the circulating mixture of solvent and feed material in this cell. An equal quantity of solvent is continuously separated by the uppermost sieve 3 and this separated solvent then flows through the uppermost conduit 1' to the cell n−1. As stated before, the deflector 7 prevents the solvent entering through the discharge nozzle 2a from being admixed to the material circulating in the cell so that, and referring to the cell $n$, the solvent admitted through the pipe 14a and admixed to the feed material which circulates in the cell $n$, cannot be admixed to the solvent which flows through the uppermost sieve 3 into the chamber 9 of the cell $n$ and thence through the uppermost conduit 1 into the cell $n-1$. Of course, and as indicated by the arrows $X'''$, a certain portion of the mixture circulating in each cell will stream against the concave inner side of the sieve 3, particularly against the outermost portions of the sieve adjacent to the respective flange 6, and the solvent separated from this portion of the mixture will be admixed in the chamber 9 to the solvent separated from the mixture admitted through the discharge nozzle 2a to return to the cell located therebelow. The mixture streaming in the direction of the arrows $X'''$ prevents the mixture discharged through the nozzle 2a from flowing into the center of the cell so that the mixture admitted by the nozzle 2a is always directed against the sieve which insures that the solvent is separated from this mixture and returns to the cell therebelow. As stated above, the quantity of solvent flowing from the cell $n$ through the uppermost conduit 1 and into the cell $n-1$ equals the quantity of solvent admitted through the pipe 14a. The solvent separated by the sieve 3 of the cell $n-1$ flows to the cell located below the cell $n-1$ and so on until the enriched solvent reaches the cell I and is finally withdrawn through the conduit 1a.

In order to provide some means for controlling the duration of extraction in dependency on the combined volume of the cells I . . . $n$, it is advisable to install in each cell a valve 16 which regulates the flow of the mixture through the conduits 2' leading from cell I to cell II, from cell II to cell III and so on to the cell $n$. In FIG. 2, these valves are shown schematically as slide valves having handgrip means extending from the respective cells so that they may be manually adjusted by an operator, if necessary. By adjusting the valve 16, the operator may control the concentration of feed material and/or solvent in the mixtures filling the respective cells.

It will be noted that the sieves 3 are preferably arranged at opposite ends of the consecutive cells I . . . $n$. Each of these sieves performs a dual function, namely, it causes the mixture of feed material and solvent to circulate and it also filters or separates the solvent from the mixture. The modified apparatus of FIGS. 7 and 8 differs from the apparatus of FIG. 2 in that the sieves 3 mainly serve as solvent separating means because the apparatus of FIGS. 7 and 8 comprises other means for agitating or circulating the mixture in each of the cells I . . . $n$. Such parts of the apparatus shown in FIGS. 7 and 8 which are identical with or which are obviously analogous to those described in connection with FIGS. 3 to 6b are provided with the same reference numerals. Thus, the modified apparatus of FIGS. 7 and 8 again comprises a series of superimposed cells I . . . $n$ which are connected with each other by conduits 1'. The inlet pipe 10 is replaced by an inclined chute 10' which delivers to the trough 12 a comminuted feed material, e.g. pulp consisting of sugar can or sugar beets. The trough 12 also receives enriched solvent which is admitted through the conduit 1. The conduit 1a is provided with a valve 1a' which may regulate the discharge of fully enriched solvent from the apparatus.

Figure 7:
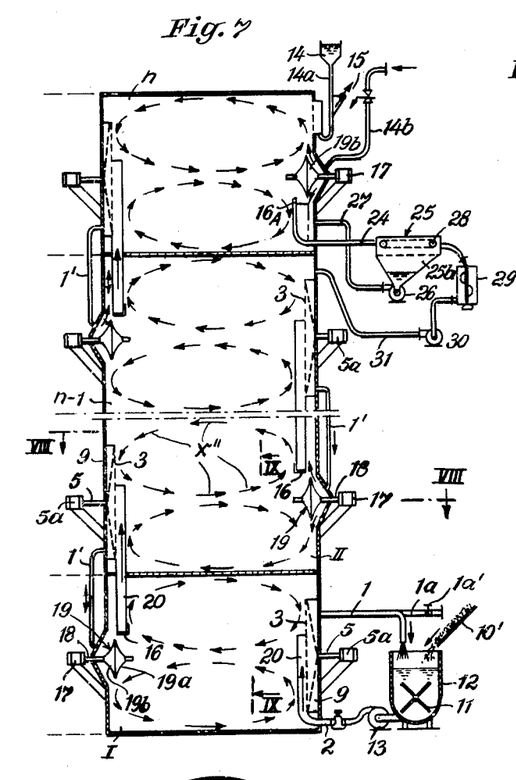
FIG. 7 is a schematic vertical section through a modified extraction apparatus whose superimposed vessels are formed with common upper and lower walls and wherein the sieves mainly perform a filtering or separating action because the contents of the vessels are agitated by specially configurated circulation producing wheels.
Figures 8, 8A:
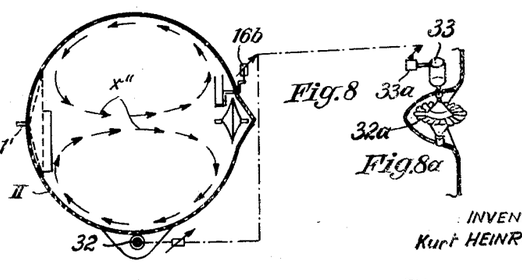
FIG. 8 is a horizontal section through a vessel as seen in the direction of the arrows from the line VIII—VIII of FIG. 7.
FIG. 8a is an enlarged perspective view of a metering device for determining the concentration of feed material in a vessel.

Each cell forming part of the apparatus shown in FIGS. 7 and 8 comprises an agitating or circulation producing means in the form of a twin cone 19 whose conical portions 19a, 19b abut against each other with their maximum-diameter end faces. Each circulator 19, hereinafter called wheel, comprises a coaxial drive shaft 18 which extends through the adjacent wall of the respective cell and is driven by a motor 17. The conical faces of the wheels 19 are preferably knurled, formed with radial ribs, or they may be formed with substantially helical convolutions 19c, shown in FIG. 9. The cone 19a faces the interior of the respective cell and produces turbulence in the mixture filling the cell. The larger-diameter portion of the rapidly revolving cone 19a produces superatmospheric pressure and compels the mixture to flow radially outwardly whereas the tip of the cone 19a produces subatmospheric pressure and thereby draws the mixture toward the larger-diameter portion. Such difference in pressures prevailing adjacent to different zones of the cone 19a creates the desired turbulence in the cell. In other words, the mixture of solvent and feed material is drawn axially toward and is thereupon repelled radially away from the cone 19a. The other cone 19b serves as a means for sucking or drawing solvent through the conduit 1' from the cell located thereabove, i.e. the cone 19b of the cell I draws enriched solvent through the conduit 1' leading to the cell II. It will be noted that the discharge end of the conduit 1' leading to the lowermost cell I is adjacent to the suction-producing tip of the outer cone 19b so that the solvent accumulating in the chamber 9 of cell II is drawn into the cell I when the wheel 19 of the cell I rotates at high speed. Such wheels are equally useful for thoroughly mixing two different liquids or for mixing one or more comminuted solid materials with two or more liquid substances.

The larger-diameter portion of the cone 19b compels the solvent drawn through the conduit 1' to flow into the main space of the cell I and to be admixed to the circulating mixture in this cell so that the solvent already contained in the cell I is mixed with the solvent delivered from the cell II through the lowermost conduit 1'.

Figures 9, 10, 12, 13, 13A:
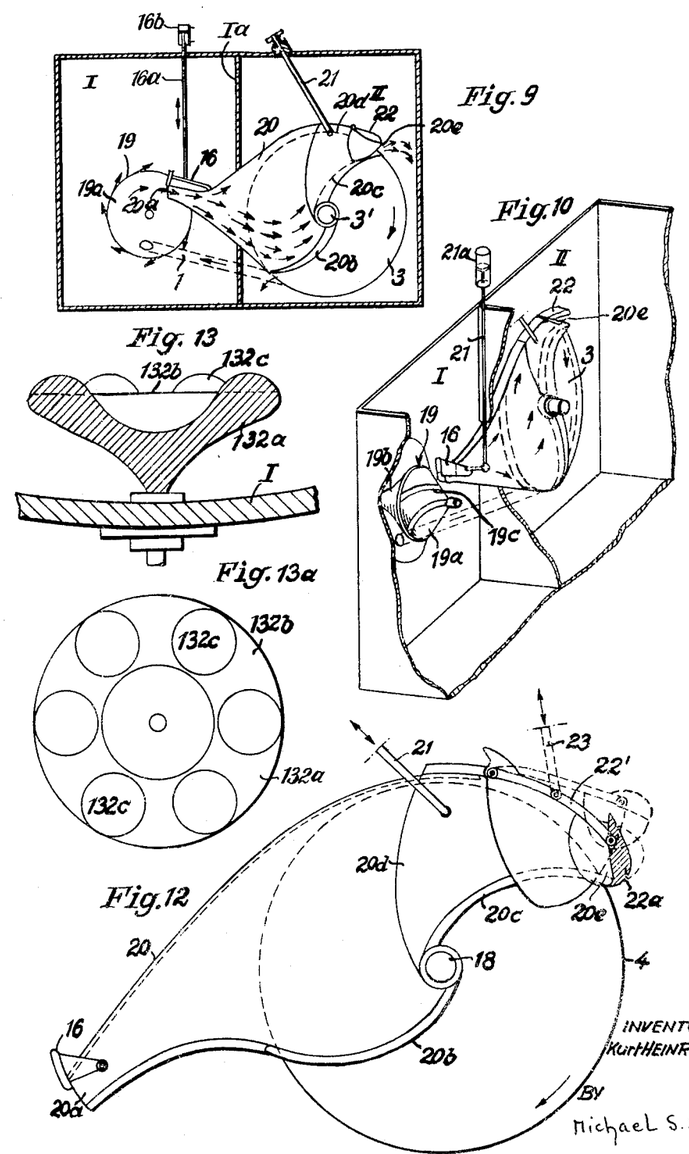
FIG. 9 is an enlarged fragmentary section as seen in the direction of the arrows from the line IX—IX of FIG. 7.
FIG. 10 is a perspective view of the structure shown in FIG. 9.
FIG. 12 is an enlarged front elevational view of a modified conduit for conveying the mixture of feed material and solvent from a lower vessel to a vessel thereabove.
FIG. 13 is a fragmentary partly sectional view of a modified metering device.
FIG. 13a is a top plan view of the metering device shown in FIG. 13.
Figure 11:
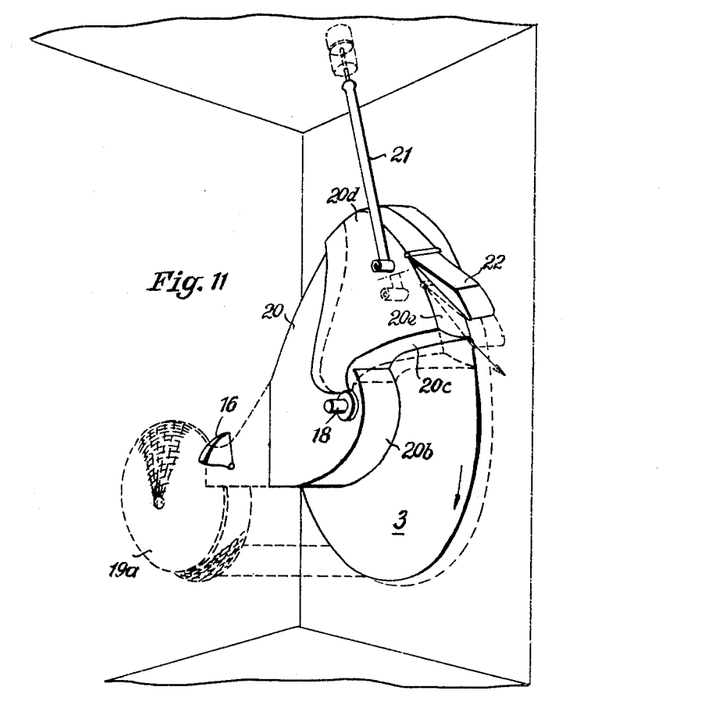
FIG. 11 is a greatly enlarged perspective view of the sieve shown in FIGS. 9 and 10.

The sieves 3 face the respective cones 19a and are adjacent to the other ends of the respective cells. The sieve 3 in the lowermost cell I separates enriched solvent from a certain portion of the mixture contained in this cell and also separates solvent from the mixture admitted to the cell I through the conduit 2. The sieve 3 then causes the separated solvent to flow through the conduit 1 to the trough 12 and/or to the conduit 1a. The sieve is rotated at a high speed by the motor 5a through a drive shaft 5. As in the embodiment of FIG. 2, each cell comprises a chamber 9 which is adjacent to the convex side of the respective sieve 3 and communicates with the intake end of the conduit 1 or 1' to collect the solvent separated by the respective sieve. The sieve 3 of the cell II and the wheel 19 of the cell I are shown on a larger scale in FIGS. 9 to 11. A certain amount of the mixture coming into the range of the cone 19a is engaged by the ribs or convolutions 19c and is caused to flow tangentially outwardly and into the intake 20a of a specially configurated conduit 20 which forms part of the conduit means for the mixture and which leads to the sieve 3 of the cell II. The exposed area of the intake 20a in the conduit 20 may be varied by means of a slide valve 16. As shown in FIGS. 9 to 11, the slide valve 16 may be adjusted by a linkage 16a which is movable by a double-acting hydraulic or pneumatic cylinder 16b.

That side of the conduit 20 which faces the conical side of the sieve 3 is open so that the mixture expelled by the lowermost cone 19a from the cell I is free to flow against the inner side of the sieve in the cell II which latter sieve then separates feed material from the solvent in that the solvent flows into the chamber 9 of the cell II and is returned to the cell I through the lowermost conduit 1' under the sucking action of the cone 19b in the cell I. The conduit 20 extends through the partition Ia separating the cells I and II, and this conduit diverges in a direction toward the cell II so that it screens say about one half of the concave side of the sieve 3 in the cell II. The open upper or discharge end of the conduit 20 is partially closed by a pair of arcuate wipers 20b, 20c, the latter secured to a housing 20d which is mounted on the conduit 20. The housing 20d is pivotally connected to the shaft 18 and is adjustable with respect to the axis of the sieve by means of a linkage 21 extending through a wall of the cell II and connected at its outer end with the piston of a double acting fluid cylinder 21a. The wiper 20b deflects the solid feed material circulating in the cell II under the action of the wheel 19 (arrows X″) so that the feed material circulating in the main space of the cell II between the wheel 19 and the conduit 20 is deflected back toward the wheel as shown in FIG. 7. The housing 20d is formed with an aperture 20e through which the wiper 20c deflects the feed material separated from the mixture admitted through the conduit 20 from the cell I. The feed material passing through the aperture 20e is then admixed to the material circulating in the cell II. The adjustability of the wiper 20c with respect to the conduit 20 and the sieve 3 renders it possible to change the ratio between the screened and exposed areas of the sieve in the cell II so as to thereby adjust the ratio of solvent admitted through the conduit 20 from the cell I and the solvent returned from the chamber 9 of the cell II to the conduit 1′ and thence to the cell I. The aperture 20e of the housing or extension 20d is automatically sealable by a biased baffle or flap 22. The baffle 22 may be biased by a weight or by a suitable spring and exposes the aperture 20e in a fully automatic way when deflected by the feed material delivered by the wiper 20c. The purpose of the baffle 22 is to expose the aperture 20e only to such an extent as is necessary for the evacuation of feed material from the conduit 20 into the interior of the cell II.

Alternately, the sieve 3 may remain stationary and the wipers 20b, 20c are then rotated with respect thereto.

FIG. 12 shows a modified baffle 22′ which is provided with a swingable weighted end portion 22a; the latter's weight is such that it normally seals the aperture 20e. The baffle 22′ is provided with adjusting means 23 in the form of a lever or the like, this lever serving as a coarse adjusting means whereas the weight of the swingable end portion 22a automatically insures fine adjustment in the exposed area of the aperture 20e in dependency on the pressure of feed material guided by the wiper 20c.

Referring back to FIG. 7, it will be noted that the wheel 19 of the cell I cooperates with the sieve 3 of the cell II, that the wheel 19 of the cell II cooperates with the sieve of the cell located above the cell II, and so on. Analogously, the cone 19b of the wheel 19 in the cell n−1 draws solvent from the chamber 9 of the cell n and so on to the lowermost cell I.

Fresh solvent is admitted to the cell n in the apparatus of FIG. 7 through an inlet pipe 14b whose discharge end is adjacent to the suction cone 19b in the cell n. The delivery of fresh solvent through the pipe 14b is controlled by a level gauge 15 which senses the level of solvent in a siphon feeder 14, 14a. The latter's pipe 14a is communicatively connected with the internal space of the uppermost cell n.

In order to insure that the percentage of feed material in each cell remains within a predetermined range, the cells are provided with metering devices 32 which are operatively connected with and adjust the valves 16 in such a way as to regulate the flow of the mixture through the intakes 20a of the conduits 20 between the adjacent cells. One metering device 32 is shown in greater detail in FIG. 8a. It compises a corrugated disk 32a which is driven by a servomotor 33. The disk is mounted in the interior of the respective cell so that the motor 33 meets more resistance if the concentration of feed material increases. Thus, the consumption of electric current by the motor 33 increases with increasing concentration of feed material if the disk 32a is to be driven at a constant speed. The changes in current consumption of the motor 33 are sensed by a device 33a of known design, and the ammeter of this device thereupon adjusts the piston in the cylinder 16b to shift the lever 16a (see FIG. 9) through a distance corresponding to the change in the concentration of feed material in the respective cell.

Another metering device for determining the concentration of feed material in a cell is shown in FIG. 13 and 13a. The disk 132a of this metering device is again driven by a servomotor, not shown, and is mounted adjacent to the inner side of the cylindrical wall of the respective cell. As shown in FIG. 13, the disk is formed with a tulip-like portion turned toward the interior of the cell and having an annular face 132b formed with a plurality of substantially semispherical projections 132c. It has been found that six projections 132c will produce very satisfactory results. The resistance met by the projections 132c when the disk 132a rotates at a constant speed is sensed by the ammeter of the device 33a and the latter thereupon adjusts the respective valve 16 in such a way that the exposed area of the intake 20a in the respective conduit 20 will be adjusted in accordance with desired concentration of feed material in the cell.

FIG. 7 shows in greater detail the device 25 for removing feed material from the last cell n. The intake end of the conduit 24 extends into the interior of the cell n and its exposed area is controllable by a valve 16a whose construction may be the same as that of the valves utilized for regulating the flow of material into the conduits 20. The feed material removing device 25 comprises a container 25b accommodating a conveyor 28 which advances the solids to a press 29 whereas the solvent accumulates in the lower part of the container 25b and is returned to the cell n by a pump 26 provided in a return conduit 27. It will be noted that a filter 25a is provided beneath the conveyor 28 so as to insure that no feed material can enter the pump 26 and the conduit 27. The solvent separated from the feed material in the press 29 is returned to the cell n−1 by a pump 30 which is mounted in the conduit 31. It will be readily understood that the conduit 31 may communicate with two or more cells or that it may communicate with the cell n as shown in FIG. 2. The exact construction of the conveyor 28 and of the press 29 forms no part of the present invention.

Figure 14:
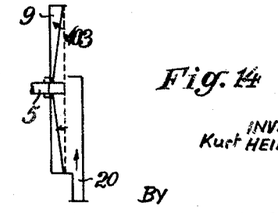
FIGS. 14 to 17 are schematic axial sections through different types of conical sieves for use in the apparatus of FIGS. 2 and 7.
Figure 15:
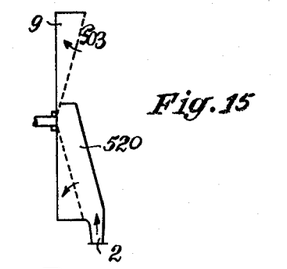
Figures 16, 17, 18:
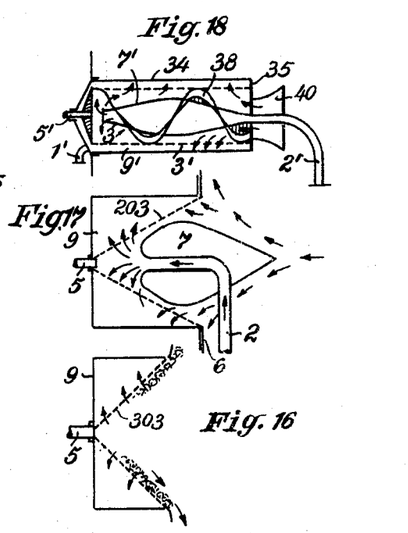
FIG. 18 is an axial section through a cylindrical sieve.

FIGS. 14 to 18 illustrate several forms of sieves which may be utilized in the extraction apparatus of my invention. As mentioned hereinbefore, the conicity of the sieves depends on the consistency of feed material and is more pronounced if the feed material is harder. The sieve 203 of FIG. 17 is similar to that shown in FIG. 3 excepting that its conicity is more pronounced. The conicity of the sieve 303 shown in FIG. 16 is somewhere between the conicity of sieve 203 and sieves 3 shown in FIG. 2. FIG. 14 shows a sieve 403 which is analogous to that shown in FIG. 7, and FIG. 15 shows a sieve 503 which cooperates with a conduit 520 having its enlarged upper portion bent inwardly toward the concave side of the sieve.

Figure 19:
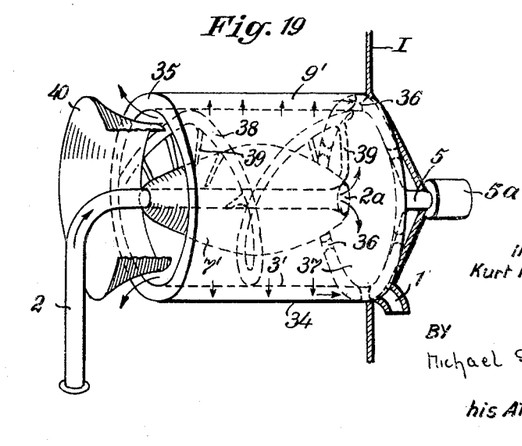
FIG. 19 is an enlarged perspective view of the sieve shown in FIG. 18.

FIGS. 18 and 19 show a different sieve 3′ in the form of a hollow cylinder which is concentrically received in a larger-diameter cylindrical chamber or drum 34. The cylindrical wall of the drum 34 defines with the sieve 3′ an annular compartment 9′ one end of which is closed by an annular collar 35 of the drum 34. At its other end, the sieve 3′ is supported by inwardly extending radial ribs 36 of the drum 34. This other or inner end of the sieve 3′ is closed by a bottom end wall 37 which is connected to the drive shaft 5. The shaft 5 extends through the adjacent wall of the cell I and is driven at high speed by a motor 5a. The sieve 3′ accommodates a stationary streamlined deflector 7′ which is coaxial with the drive shaft 5 and which assumes the form of a twin cone somewhat resembling the wheels 19. The conduit 2 extends through the deflector 7′ and is formed with an outwardly diverging discharge nozzle 2a. It will be noted that the conduit 2 actually supports the deflector 7′ in the interior of the sieve 3′. The deflector 7′ in turn supports a helically convoluted cleaning element or wiper 38 which is adjacent to the inner side of the sieve 3′ and which is connected with the deflector by radial arms 39. The purpose of the element 38 is to scrape the feed material entering through the open outer end of the sieve 3' from the latter's inner side so that the solvent may pass through the perforations of the sieve and into the compartment 9'. In addition, the helically convoluted element 38 automatically expels the feed material from the interior of the sieve when the latter rotates with the shaft 5.

A hollow frustoconical guide tube 40 extends into the open outer end of the sieve 3'. The diameter of that end of this tube which extends into the sieve 3' is smaller than the inner diameter of the collar 35. The tube 40 is connected with the element 38 and/or with the deflector 7'.

The mixture of solvent and feed material admitted through the nozzle 2a of the conduit 2 enters the internal space of the rapidly revolving sieve 3'. The solvent passes through the perforations of the sieve into the compartment 9' and flows through the connecting conduit 1 to the mixer 11, not shown in FIGS. 18 and 19. At the same time, a portion of the mixture already contained in the cell I enters the interior of the sieve 3' through the guide tube 40. The sieve separates solvent from this portion of the mixture and the separated solvent enters the compartment 9' to be led away through the conduit 1 in admixture to the solvent separated from the mixture discharged through the nozzle 2a. The cleaning element 38 removes feed material from the internal space of the sieve 3' and advances the feed material through the annular gap between the tube 40 and collar 35 into the main space of the cell I.

It will be readily understood that the arrangement of FIGS. 18 and 19 will operate with equal efficiency if the sieve 3' is stationary and if the deflector 7' and the element 38 are caused to rotate with respect to the sieve.

The extraction apparatus may be modified in many respects without departing from the spirit of my invention. Thus, the cells may be combined to form an upright or inclined tower, and it is also possible to dispose the cells in a horizontal plane or in staggered relation with respect to each other. Furthermore, the upper ends of the cells may remain open so that the extraction is carried out at atmospheric pressures and the circulating and separating means provided therein may differ from those shown in the drawings as long as they insure that the process may be carried out in the described manner. If the cells are open, each thereof is preferably provided with a level gauge which regulates the flow of liquid in such a way that the level of material in the cells remains constant.

The apparatus according to FIGURES 2 and 7 is suitable for continuous countercurrent extraction of sugar-containing substances from sugar-beet cossettes, crushed sugar cane, dates, figs, size-reduced liquorice and crushed reed before blossom. The temperatures of the countercurrent solvent are selected well in compliance with a specific feed material in the same manner as in the case of conventional extraction processes. The temperature suitable for sugar-beet cossettes if 70° C. whereas a temperature of 20° C. is the one usual for sugar cane, it being advantageous for avoiding bacteria attack, however, to employ like temperatures of 70° C.

The apparatus according to FIGURES 2 and 7 may be used also for continuous countercurrent extraction of adipose and glue-containing substances, so from crushed bones, in using a countercurrent extraction solvent capable of dissolving adipose matters, such as benzine. Hot water having a temperature of approximately 50–70° C. may be used for extracting glue-containing substances from bones.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be protected by Letters Patent is:

1. An apparatus for extracting a soluble substance from a material, said apparatus comprising, in combination, a plurality of treating vessels arranged in series and including a first treating vessel and a last treating vessel; means for introducing unextracted material into said first treating vessel and means for removing extracted material from said last treating vessel after said material has passed through said plurality of treating vessels in a first direction from said first treating vessel to said last treating vessel; means for introducing a solvent into said last treating vessel and means for removing said solvent in at least partly saturated state from said first treating vessel after having passed in countercurrent to the material in opposite direction from said last treating vessel to said first treating vessel; a plurality of rotary separating sieves each arranged in one of said treating vessels dividing the same into a treating chamber and a separating chamber; a plurality of first conduit means connecting said treating chambers of said treating vessels in series, each of said first conduit means connected at its inlet to the treating chamber of one of said treating vessel and having its outlet end located in the treating chamber of the treating vessel following it in said first direction for conveying a material-solvent mixture from said one to said following treating vessel, said outlet end being arranged opposite the rotary separating sieve therein so that the solvent in said material-solvent mixture will pass through said rotary separating sieve into the separating chamber of said following treating vessel without substantially mixing with the material-solvent mixture present in the treating chamber of said next following treating vessel and without being substantially diluted thereby; and a plurality of second conduit means connecting said separating chambers of said treating vessels in opposite direction to the treating chambers of the respectively preceding treating vessels so as to conduct all the solvent having passed through said rotary separating sieves into said separating chambers of said treating vessels into the treating chambers of the respectively preceding treating vessels.

2. An apparatus according to claim 1, wherein each of said plurality of rotary separating sieves, respectively, is of conical configuration having a concave side facing said respective treating chamber.

3. An apparatus according to claim 2, wherein each of said conical rotary separating sieves, respectively, comprises an annular flange for guiding said material into the respective treating chamber.

4. An apparatus according to claim 3, wherein said annular flanges are disposed in planes substantially perpendicular to the axes of the respective rotary sieves.

5. An apparatus according to claim 3, wherein said flanges are of frustoconical shape.

6. An apparatus as set forth in claim 3, wherein each of said flanges is formed with an undulate side facing said respective treating chamber.

7. An apparatus as set forth in claim 3, wherein each of said flanges has a side facing said respective treating chamber and said side is formed with substantially radially arranged groups of alternating projections and depressions.

8. An apparatus as set forth in claim 3, wherein each of said flanges has a side facing said respective treating chamber and said side is formed with substantially tangentially arranged groups of alternating depressions and projections.

9. An apparatus as set forth in claim 2, wherein each of said conical separating sieves has perforations bounded by conical walls for the passage of solvent therethrough.

References Cited by the Examiner

UNITED STATES PATENTS

| | | | |
|---|---|---|---|
| 585,188 | 6/97 | Davis | 55—400 |
| 1,297,171 | 3/19 | Holley | 23—270 |
| 1,319,320 | 10/19 | Benjamin | 127—43 |
| 1,496,517 | 6/24 | Boehn | 210—324 X |
| 2,295,937 | 9/42 | Crane et al. | 210—403 |
| 2,650,176 | 8/53 | Horton et al. | 127—43 |
| 2,706,016 | 4/55 | Schlumbohm | 55—400 |
| 2,726,145 | 12/55 | Thomas | 23—270.5 |
| 2,748,951 | 6/56 | Dubach | 210—403 |

NORMAN YUDKOFF, *Primary Examiner.*

MORRIS WOLK, *Examiner.*